United States Patent [19]

Morishita

[11] Patent Number: 4,510,406

[45] Date of Patent: Apr. 9, 1985

[54] MULTI-USE STARTING DEVICE

[75] Inventor: Akira Morishita, Himeji, Japan

[73] Assignee: Mitsubishi Denki Kabushiki Kaisha, Tokyo, Japan

[21] Appl. No.: 574,260

[22] Filed: Jan. 26, 1984

[30] Foreign Application Priority Data

Feb. 4, 1983 [JP] Japan .......................... 58-15561[U]

[51] Int. Cl.[3] .......................................... H02K 7/10

[52] U.S. Cl. .................................. 310/99; 74/7 E; 310/83

[58] Field of Search .................. 310/75 R, 83, 96, 99, 310/108, 78, 90, 92, 100; 123/179 M; 74/7 E, 801

[56] References Cited

U.S. PATENT DOCUMENTS

| | | | |
|---|---|---|---|
| 1,375,319 | 4/1921 | Rae | 310/99 |
| 1,558,806 | 10/1925 | Hess | 310/99 |
| 2,050,185 | 8/1936 | Kibler | 310/99 |
| 3,991,734 | 11/1976 | Martin | 123/179 E |
| 4,295,069 | 10/1981 | Givan et al. | 310/83 |
| 4,462,274 | 7/1984 | Reppert et al. | 74/801 |

FOREIGN PATENT DOCUMENTS

| | | | |
|---|---|---|---|
| 3121058 | 1/1983 | Fed. Rep. of Germany . | |
| 904851 | 11/1945 | France | 74/7 E |
| 416506 | 9/1934 | United Kingdom . | |
| 1014787 | 12/1965 | United Kingdom . | |
| 2081992 | 2/1982 | United Kingdom . | |

*Primary Examiner*—J. D. Miller
*Assistant Examiner*—D. L. Rebsch
*Attorney, Agent, or Firm*—Oblon, Fisher, Spivak, McClelland & Maier

[57] ABSTRACT

A starting device comprises a cylindrical driving shaft, a rotary output shaft placed contiguous to one end of said driving shaft and extending in alignment therewith, a speed reduction unit for reducing revolution of said driving shaft to transmit power from said driving shaft to said rotary output shaft, and a power transmitting shaft which is firmly connected in alignment with said rotary output shaft and is passed coaxially through said driving shaft so as to be rotatable therein, one end of said power transmitting shaft extending from the other end of said driving shaft.

3 Claims, 2 Drawing Figures

MULTI-USE STARTING DEVICE

The present invention relates to a starting device for use with a purpose of other than producing torque in a prime mover.

Although a starting device has been primarily used to start an engine, it is possible to modify it for the other purposes, for instance, of driving a pump by reducing revolutions of the prime mover of the starting device to increase its torque, at a time other than starting of the engine.

There is proposed, as a device of this kind, one as disclosed in Japanese Unexamined Utility Model Publication No. 152840/1980 (Japanese Utility Model Application No. 52642/1979). Such device will be described with reference to FIG. 1. In the figure, the device comprises battery 1; fuse 2; first, second and third control switches, 3, 4, 5, respectively; electromagnetic switch 6 constituted by a normally opening contact 7, a solenoid coil 8 and a movable iron core 9; shift lever 10 engaged with the movable iron core 9 through a cam means; pivotal point 11 around which the shift lever 10 is turned; spline cylinder 12; engaging groove 13 which is formed in the spline cylinder 12 so as to be slidably fitted with the lower end of the shift lever 10; pinion 14 fitted on the spline cylinder 12; d.c. motor 15; rotary shaft 16 of the d.c. motor 15 connected to the spline cylinder 12 through the spline structure; spur gear 17 meshed with the pinion; power transmitting shaft 18 firmly fitted to the spur gear 17; bearing box 19; ring gear 20 of an engine which is caused to mesh with the pinion 14; crank shaft 21 of the engine on which the ring gear 20 is firmly fitted; and relay 23 comprising a coil 24 and a normally opening contact 25.

The operation of the starting device having the above-mentioned structure will be described.

First of all, a first control switch 3 is closed to complete preparation for starting. When the second control switch 4 is closed, the voltage of the battery 1 is applied to the solenoid coil 8 of the electromagnetic switch 6. Energizing of the solenoid coil attracts the movable iron core 9 in the right direction in the figure whereby the shift lever 10 is turned clockwise around the pivotal point 11. The turning movement of the shift lever 10 causes the spline cylinder 12 fitted through the spline structure to the rotary shaft 16 of the d.c. motor to shift in the arrow mark direction A in the figure so that the pinion is brought into interlock with the ring gear 20. On the other hand, energization of the solenoid coil makes a closing condition with respect to the normally opening contact 7 of the electromagnetic switch 6, to cause application of the voltage of the battery 1 to the d.c. motor 15, with the result that the rotary shaft 16 of the d.c. motor is rotated, hence the pinion 14 is also rotated. Rotation of the pinion 14 causes the ring gear 20 interlocking therewith to rotate and accordingly, the crank shaft 21 is rotated, thereby starting the engine.

When the second control switch 4 is opened, the movable iron core 9 of the electromagnetic switch 6 is returned to the position as shown in the FIG. 1 by the urging force of a spring (not shown). Then, the spline cylinder 12 is transferred in the arrow mark direction B by the pivotal movement of the shift lever 10 and the pinion 14 is disconnected from the ring gear 20 and is brought to interlock with the spur gear 17. On the other hand, the normally opening contact 7 of the electromagnetic switch 6 is returned to closing condition, whereby the rotational force of the d.c. motor 15 is stopped.

When the third control switch 5 is closed, the voltage of the battery is applied to the coil 24 of the relay 23 to close the normally opening contact 25, on account of which the voltage of the battery 1 is applied to the d.c. motor 15 to start it. Revolution of the rotary shaft 16 of the d.c. motor causes the power transmitting shaft 18 to rotate through the pinion 14 and the spur gear 17, hence a load to be rotated, such as a pump, connected to the power transmitting shaft 18, is driven.

In the conventional starting device as above-mentioned, however, there were disadvantages of complicated structure, large size, increased weight and so forth, because it must be so constructed that the rotary shaft of the d.c. motor is placed apart from the power transmitting shaft and the spur gear fixed on the power transmitting shaft is brought into interlock with the pinion when the pinion is shifted to the original position.

It is an object of the present invention to eliminate the disadvantage of the conventional starting device and to provide an improved starting device of simple and miniaturized structure and of light weight by constructing it in such a manner that one end of cylindrical driving shaft is connected to a rotary output shaft through a speed reduction unit and a power transmitting shaft firmly connected to the rotary output shaft is passed coaxially through in the dirving shaft to extend to the opposite side of the rotary output shaft with respect to the driving shaft.

According to the present invention, there is provided a starting device comprising a cylindrical driving shaft, a rotary output shaft placed contiguous to one end of the driving shaft and extending in alignment therewith, a speed reduction unit for reducing revolution of the driving shaft to transmit power from said driving shaft to the rotary output shaft and a power transmitting shaft which is firmly connected in alignment with the rotary output shaft, and is passed through in the driving shaft so as to be supported in rotatable manner, one end of said power transmitting shaft extending from the other end of the driving shaft.

The foregoing objects, other objects as well as specific construction and operation of the starting device according to the present invention will become more apparent and understandable from the following description of it, when read in conjunction with the accompanying drawing.

Figure 2:
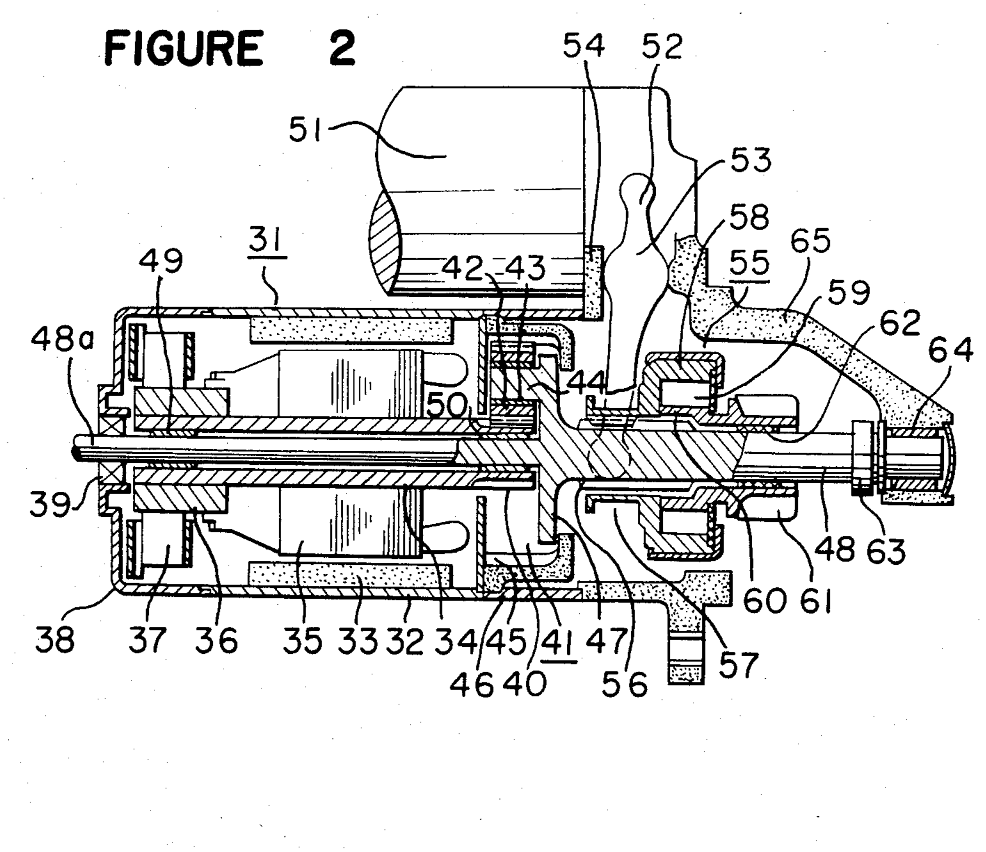
FIG. 2 is a longitudinal cross-sectional view partly omitted of an embodiment of the starting device of the present invention.

An embodiment of the present invention will be described with reference to FIG. 2 showing as an example a multi-functional internal reduction gear type starting device.

A d.c. motor 31 mainly comprises a yoke 32, field poles 33, a rotary shaft 34 which constitutes a driving shaft having a cylindrical form and an armature 35 secured to the rotary shaft 34. At one end of the rotary shaft 34, there is connected a commutator 36 on which brushes 37 are placed to feed current. A ball bearing 39 is fitted to a rear bracket to support one end of a power transmitting shaft 48*a* which will be described later. A spur gear 40 is formed at one end of the rotary shaft 34, at the opposite side with respect to the rear bracket 38.

A planetary gear speed reduction device 41 is placed on the side where the spur gear 40 is formed in the rotary shaft 34. The speed reduction device 41 is constituted by a planetary gear 42 being always interlocked with and rolling around the spur gear 40, a sleeve bearing 43 fitted in the central bore of the planetary gear 42, a pin 44 rotatably supporting the planetary gear 42 with the sleeve bearing 43, an internal gear 45 having a ring gear at its inside with which the planetary gear 42 is interlocked, an intermediate frame 46 fitted with the internal gear 45 and a flange 47 firmly connected with the pin 44. The flange 47 is formed integrally with a rotary output shaft 48 which is placed contiguous to one end of the driving shaft and extends to a front bracket 65 in alignment with the axial line of the driving shaft 34. The rotary output shaft 48 receives rotational force of the driving shaft 34 of the d.c. motor 31 with a speed reduced by the planetary gear speed reduction device 41. A power transmitting shaft **48*a* is formed or connected integrally with one end of the rotary output shaft 48 at the position contiguous to the driving shaft 34, and the free end of the power transmitting shaft 48*a* passes through the inner bore of the driving shaft 34 to extend from the rear bracket 38. Between the inner surface of the cylindrical driving shaft 34 and the outer periphery of the power transmitting shaft 48*a* at both ends of the driving shaft 34, a pair of sleeve bearings 49, 50 are interposed to support the power transmitting shaft 48*a*** in rotatable manner.

An electromagnetic switch 51 is attached to the upper part of the front bracket 65. A shift lever 52 is placed in such a manner that its pivotal point 53 is held by a grommet 54 formed in the front bracket 65 and one end of the shift lever 52 is connected to a plunger (not shown) of the electromagnetic switch 51 while the other end is engaged with an overrunning clutch 55 which is slidably mounted on the rotary output shaft 48. The overrunning clutch 55 is constituted by a spline-fitting part 56 fitted into a spline part formed on the rotary output shaft 48, an engaging groove 57 slidably engaged with the lower end part of the shift lever 52, an outer casing 58 of the overrunning clutch 55, a friction roller 59, a clutch inner part 60 and so on. A pinion 61 is secured to the clutch inner part 60. A sleeve bearing 62 is placed on the rotary output shaft 48 to support the pinion 61. A stopper 63 is formed at the end of the rotary output shaft 48 to limit sliding movement of the pinion 61. The distal end of the rotary output shaft 48 is supported by a sleeve bearing 64 fitted to the front bracket 65.

The operation of the starting device constructed as above-mentioned will be described.

When the electromagnetic switch 51 is actuated by feeding current to operate the plunger (not shown), the shift lever 52 is turned in the counterclockwise direction in the FIG. 2 around the pivotal point 53, whereby the overrunning clutch 55 is transferred forwardly (on the right hand in the figure) on and along the rotary output shaft 48 so that the pinion 61 is brought to interlock with a ring gear (not shown) of an engine. On the other hand, as soon as the electromagnetic switch 51 is actuated, the d.c. motor 31 is also actuated to generate torque. The revolution of the driving shaft 34 of the d.c. motor 31 is transmitted to the rotary output shaft 48 with a speed reduced by the planetary gear speed reduction unit 41. The revolution of the rotary output shaft 48 is further transmitted to the pinion 61 through the overrunning clutch 55 to thereby starting the engine.

When actuation of the electromagnetic switch 51 is eliminated, force causing elements to move as described above is also eliminated and the overrunning clutch 55 and the shift lever 52 are returned to the position as shown in FIG. 2 and at the same time, the d.c. motor is stopped.

Figure 1:
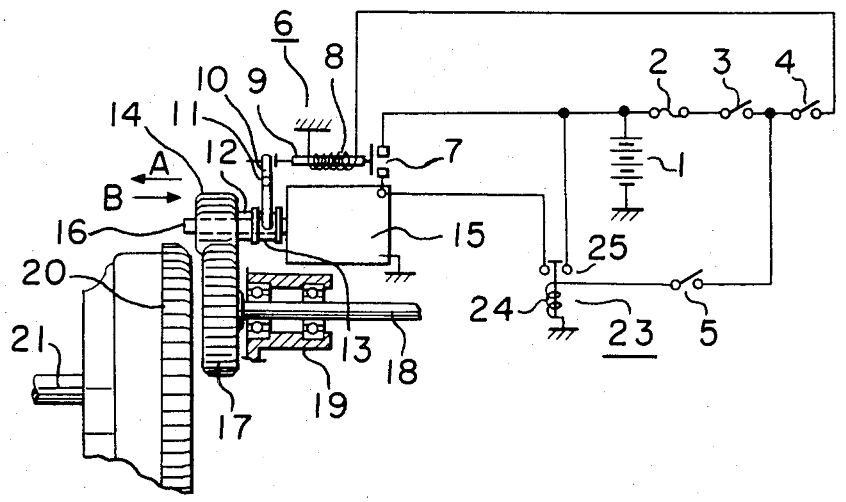
FIGURE 1 PRIOR ART
FIG. 1 is a diagram showing a conventional starting device.

In case of taking out rotational force (power) from the rotary output shaft 48 to the outside of the starting device, a power source voltage of a battery is directly applied to the d.c. motor as in the conventional starting device described with reference to FIG. 1, with the consequence that the rotary output shaft 48 is caused to rotate without the overrunning clutch 55 forwardly transferred, and the rotational force is transmitted to the power transmitting shaft **48*a* after the speed of the rotary output shaft 48 is reduced by the planetary gear speed reduction unit 41**.

In this case, the rotational force of the d.c. motor 31 is strengthened by the planetary gear speed reduction unit 41 (though the revolution is decreased) and is taken out from the power transmitting shaft **48*a* at its rear end. Since the power transmitting shaft 48*a* is coaxially arranged in the cylindrical driving shaft 34 of the d.c. motor 31**, the overall structure of the starting device can be made compact.

In the embodiment of the present invention above-mentioned, though description has been made as to that a driving shaft is provided in a d.c. motor, it is possible to obtain the same effect when the driving shaft is provided another prime mover such as a hydraulic motor, an air turbine or so on.

Briefly, in accordance with the present invention, a rotary output shaft is connected to one end of a cylindrical driving shaft in alignment therewith, through a reduction gear and a power transmitting shaft connected in alignment with the rotary output shaft is passed through in the cylindrical driving shaft to extend from the other end of the same, whereby the structure of the starting device is simplified, miniaturized, light in weight and manufactured at low cost.

I claim:

1. A starting device in combination with an internal combustion engine and a mechanical load comprising:

a cylindrical driving shaft;

a front bracket;

a rear bracket;

an armature of a D.C. motor supported on the outer periphery of said cylindrical driving shaft;

a rotary output shaft placed contiguous to one end of said cylindrical driving shaft and extending in alignment therewith, wherein a free end of said rotary output shaft is supported by a bearing means fitted to said front bracket;

a slidable overrunning clutch operatively associated with said rotary output shaft through a spline structure;

a speed reduction means for reducing revolution of said cylindrical driving shaft to transmit power from said cylindrical driving shaft to said rotary output shaft;

a power transmitting shaft firmly connected in alignment with said rotary output shaft and passed through said cylindrical driving shaft so as to be rotatable therein, one end of said power output shaft extended from the other end of said cylindrical driving shaft and wherein a free end of said power output shaft is supported by a bearing means fitted to said rear bracket;

a shift lever having its pivotal point set by a grommet formed in said front bracket, with one end of said shift lever operatively associated with said overrunning clutch;

first means for supplying electric power to said D.C. armature and for activating said shift lever in response to said internal combustion engine's starting requirements; and second means for supplying power to said D.C. armature in response to mechanical load requirements.

2. A starting device according to claim 1, wherein sleeve bearings are interposed between the inner surface of said driving shaft and the outer periphery of said power transmitting shaft at both ends of said driving shaft.

3. A starting device according to claim 1, wherein said speed reduction unit comprises a pin connected to a flange which is formed at one end of said rotary output shaft contiguous to one end of said driving shaft, a planetary gear rotatably supported by said pin, the planetary gear being interlocked with a spur gear formed at said one end of said driving shaft and an internal gear fitted to an intermediate frame and performing a planetary movement between said spur gear and said internal gear depending on revolution of said driving shaft.

* * * * *